United States Patent Office 3,770,721
Patented Nov. 6, 1973

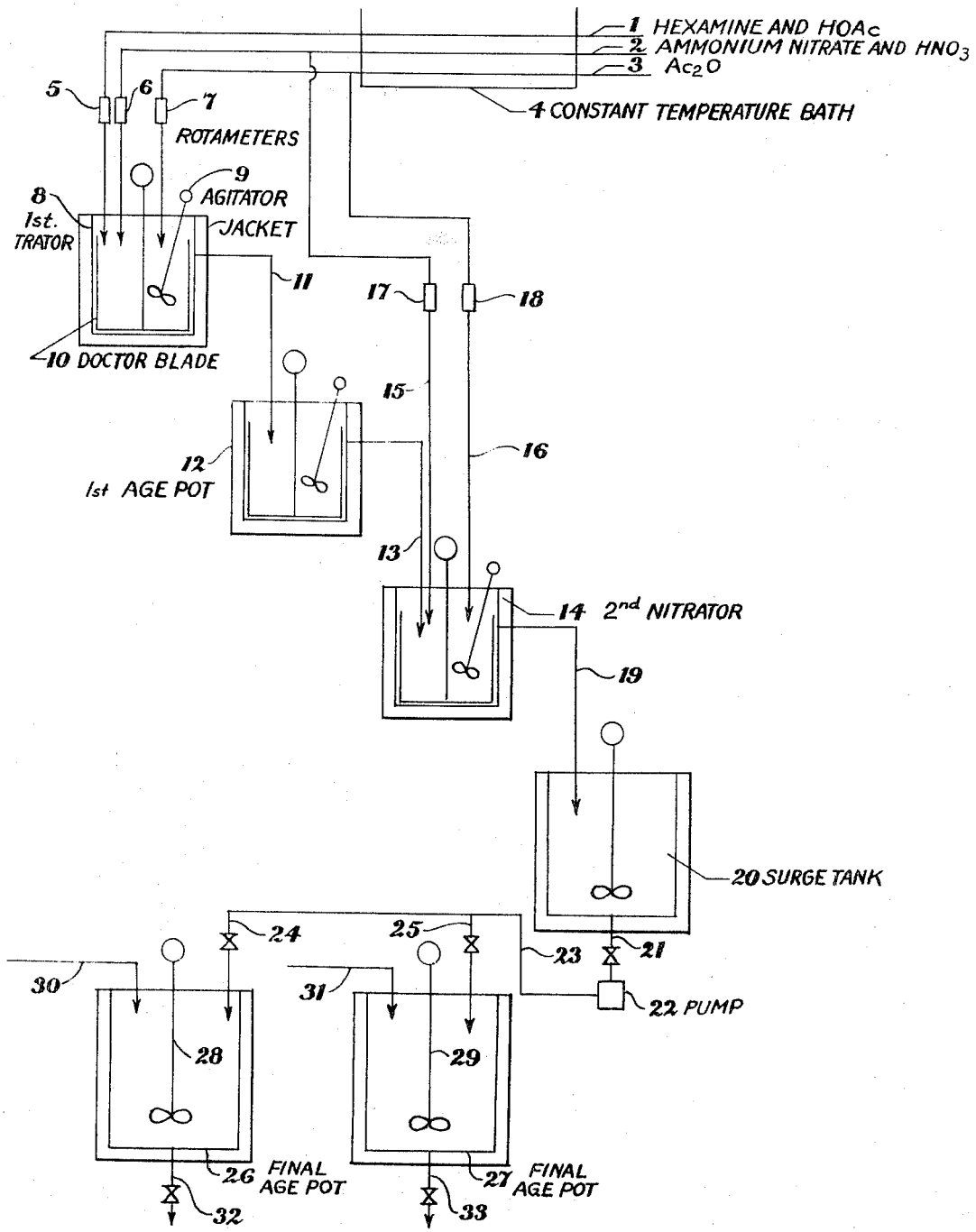

3,770,721
DIRECT PRODUCTION OF BETA-HMX
Robert Robbins and Benjamin C. Boswell, Jr., Kingsport, Tenn., assignors to the United States of America as represented by the Secretary of the Army
Filed Feb. 9, 1956, Ser. No. 564,428
Int. Cl. C07d 55/60
U.S. Cl. 260—239 HM 7 Claims This invention relates to a process for the production of 1,3,5,7 - tetranitro - 1,3,5,7 - tetrazacyclooctane, which chemical compound is referred to in the art as HMX. More particularly, this invention is concerned with a process for the direct production of beta-HMX.

It is already known that in the nitration of hexamine, while there is formed principally a trinitro compound RDX, there is also formed a tetra-nitro compound which has been called HMX. The probable structure for HMX appears to be:

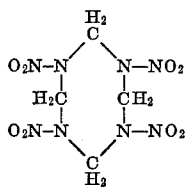

Also in the prior art it has been proposed to produce HMX from a compound referred to as DPT, 2,6-dinitro (bicyclo) pentamethylenetetramine, having the following formula:

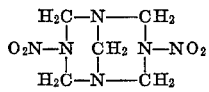

That is, the DPT has been nitrated under certain conditions to produce some HMX, but apparently the over-all yields of HMX have been rather low.

Another factor enters into any consideration of HMX manufacture in that this compound exists in at least four polymorphic forms, designated as alpha, beta, gamma and delta. The alpha and gamma modifications exhibit extremely high sensitivity if they have a crystal thickness exceeding about 10 microns. The delta crystals are almost always sensitive to impact regardless of habit. The beta polymorph has an impact sensitivity of about 30 cm. for 50% detonation with a 5-kg. weight and is the stable polymorph at ordinary temperatures.

Gamma and delta HMX are metastable below temperatures of 150° C. and our process may be controlled so that these polymorphs may not be encountered in our production of HMX. Accordingly, the two polymorphs alpha and beta HMX have the most significance. The latter is the desirable polymorph since it is the stable polymorph. Alpha HMX occurs normally as finely divided needles and is most difficult to physically handle since it is extremely difficult to filter or similarly process.

As is known, HMX is a powerful explosive. Therefore, the direct production of a relatively stable, easily handled form of HMX represents a highly desirable result. After extended investigation we have found a process whereby the relatively stable, easily filtered beta polymorph of HMX can be manufactured directly and in a relatively continuous manner by the nitration of hexamine as will be described in detail hereinafter.

This invention, therefore, has for a principal object to provide a process for producing HMX in a direct manner and in a form such that no polymorphic conversion is usually required. Still another object is to provide a process of producing HMX in a form which has a minimum cake compressibility and can be washed and filtered quite easily and has a relatively high impact sensitivity.

Still another object is to provide a streamlined direct process which may be operated in a more or less continuous manner for producing HMX of the desired polymorphic form referred to. Another object is to provide novel arrangement of equipment for carrying out a process of the aforesaid type. Other objects will appear hereinafter.

For a more complete understanding of our invention, reference will be made to the attached drawing which forms a part of the present application. The attached drawing is a semi-diagrammatic side elevation view somewhat in the nature of a flow sheet, which shows schematically an arrangement of apparatus and piping which may be used for carrying out our process.

Referring to the drawing in further detail, conduits 1, 2 and 3 are provided for supplying the reaction ingredients to the system. These conduits may be connected with storage tanks or the like, not shown. The conduits just mentioned are conducted through a constant temperature bath designated overall at 4. This constant temperature bath may be an agitated hot water chest heated by steam or electricity, or a concentric pipe heat exchanger, or a shell and tube heat exchanger or the like. Its function of maintaining a constant temperature of the feed materials is to insure against variations in feed rates due to changes in the viscosity or the density of the feed materials.

The various feed lines after leaving the constant temperature bath lead through rotameters 5, 6 and 7 or other similar device whereby the flow of materials through the conduits may be observed and controlled. The lines then discharge into a first nitrator 8. This nitrator construction is preferably made of a jacketed stainless steel vessel. A high speed agitator of conventional construction is provided at 9. Also, the nitrators and other comparable equipment are preferably provided with a revolving doctor blade 10 or other comparable means for preventing any material from adhering to the sides of the equipment. The construction of this nitrator, as well as the other nitrators and certain other equipment used in our process is similar; hence, extended description of such parts hereinafter appears unnecessary.

The first nitrator is provided with a discharge conduit 11 which leads into a first age pot 12. As just mentioned, this age pot may be generally similar in construction to a nitrator. In general any construction which provides for temperature control and agitation is usually satisfactory. The first age pot is connected by conduit 13 to a second nitrator 14. This second nitrator by conduits 15 and 16 is provided with means for supplying certain chemicals thereto. Here again preferably lines 15 and 16 are connected so as to have the benefit of the constant temperature bath 4, and are provided with rotameters 17 and 18 or other means for controlling the flow of chemicals.

The second nitrator is provided with a draw-off or over-flow line 19 which discharges into surge tank 20. The surge tank at 21, 22 and 23 is provided with conduit and pump means so that the reaction product from the surge tank may be pumped out through conduit 23 and emptied by lines 24 and 25 into a plurality of additional age pots 26 and 27. Here again, these age pots are equipped with conventional agitators as at 28 and 29, as well as one or more lines 30 and 31 through which water or other treating components may be introduced for processing the HMX reaction product. The age pots 26 and 27 are provided with draw-off lines 32 and 33 through which the crude HMX and associated material can be withdrawn for filtration, washing, drying or other treatment.

Description will now be set forth somewhat in a generic manner regarding the method which we have found permits the direct production of beta-HMX by substantially continuous nitration. The raw materials which we use comprise hexamine which is nitrated with nitric acid. We also use glacial acetic acid, ammonium nitrate, acetic anhydride and paraformaldehyde to provide reaction environment for producing the desired reaction to the beta-HMX. We have found that by suitably controlling the reaction materials as well as the temperature and the like conditions, that the reaction may be directed to the production of beta-HMX in substantial yields.

In general, reaction is carried out as follows. Hexamine, also known as hexamethylenetetramine, is dissolved in glacial acetic acid to form the solution which is fed in through conduit 1 in the attached drawing. Ammonium nitrate is dissolved in concentrated nitric acid and fed into conduit 2. Acetic anhydride is fed into conduit 3. These solutions as aforementioned are preferably fed through a constant temperature bath 4 or other similar means for obtaining uniformity of temperature. By this procedure whereby changes in the viscosity and density of the feed are minimized, it is possible to secure quite accurate control of feeds, thereby contributing to directing the reaction in the desired direction. The feed materials (together in some instances with some paraformaldehyde) enter at the first jacketed nitrator wherein the reaction materials are thoroughly agitated together as well as by careful temperature control maintained within the temperature range of 40 to 50° C. A certain amount of nitration is accomplished in the first nitrator and partially nitrated reaction product is continuously withdrawn through line 11 to the first age pot 12. In this age pot the temperature is maintained within the range of 40 to 50° C. and agitation is continued thereby thoroughly intermingling all of the feed materials and securing some further reaction. The contents of the first age pot generally after 15 minutes of aging, is continuously withdrawn through line 13 into the second nitrator.

In the second nitrator further ammonium nitrate, nitric acid and acetic anhydride are fed through lines 15 and 16. Here again preferably these lines, before they reach the second nitrator, have passed through a constant temperature bath or other means for obtaining uniformity of feed conditions. Likewise, the temperature of the second nitrator is controlled by feeding either steam or cooling fluid in the jacket so that the temperature is maintained within the range of 40–50° C. as will be discussed in further detail hereinafter. After about four minutes, during which vigorous agitation has been supplied, the contents from the second nitrator 14 is continuously withdrawn through conduit 19 into the surge tank 20.

In the surge tank the temperature is maintained within the range of 40–50° C. and vigorous agitation continued thereby securing further reaction of materials. In addition to providing aging, the surge tank permits the transition from continuous operation to a batch-wise processing of materials.

Depending upon the desired batch size, material is pumped periodically from surge tank 20 by means of pump 22 and conduits 21, 23, 24, and 25 to one of the final age pots 26 and 27. The material in the final age pots is vigorously agitated while the temperature is maintained within the range of 40–50° C. The reaction is permitted to approach completion by maintaining these conditions for 60 minutes, whereupon sufficient water is added to completely hydrolyze the anhydrous reaction materials. The aqueous mixture is heated to 98–102° C. in which range the temperature is maintained for 30 minutes. In the hydrolysis step, unstable reaction by-products are decomposed and acetic anhydride is converted to acetic acid. The aqueous material is cooled to 30° C. and discharged through lines 30 and 31. The products thus withdrawn will be comprised to a substantial extent of HMX of the desired beta configuration. For example, the composition of the crude hydrolyzed product mixture might comprise 2 to 4% HMX, 0.5 to 1.5% RDX, and 60 to 80% acetic acid.

This crude product containing 60 to 80% HMX, the balance being RDX, is recovered by filtration from the aqueous acetic acid environment; the cake of crude HMX is washed free of acid with water and dried.

It may be seen from the above general description that we have provided a substantially continuous nitration procedure under closely controlled conditions of feed and temperature which permits the direct nitration of hexamine to produce HMX. The temperature and other reaction conditions we have also found are particularly conducive to the formation of the desired beta polymorph form of HMX.

A more complete understanding of our invention will be had from a consideration of the following examples which are set forth primarily to illustrate certain of our preferred embodiments of operation.

EXAMPLE I

In accordance with this example and in order to start up the process, the first nitrator was charged with a starting heel of 300 ml. of glacial acetic acid, 25 ml. of acetic anhydride and 8 gm. of paraformaldehyde. These charged materials in the first nitrator were brought up to a temperature of about 44° C. There was then continuously fed into the first nitrator hexamine dissolved in acetic acid (90.4% acetic acid) at the rate of about 101 grams per minute. Ammonium nitrate is dissolved in nitric acid, which may be approximately 50 degrees Baumé, to form a solution containing 56.4% nitric acid. This solution was fed into the first reactor through a separate conduit at the rate of 22.0 grams per minute. Acetic anhydride (97.5% minimum purity) was fed into the nitrator through another conduit at the rate of 53.3 grams per minute. While maintaining reaction at approximately the aforementioned 44° C. temperature, the ingredients were subjected to vigorous agitation. As earlier mentioned, the incoming feed materials are preferably passed through a constant temperature bath to preheat them and maintain them at a uniform temperature of 40° C. as they are being fed into the first nitrator as this permits more accurate feed control. After about 15 minutes reaction time at the temperature of about 44° C. in the first reactor, a certain portion of the ingredients had reacted. Therefore, reaction product was then continuously withdrawn from the first reactor to the first age pot.

In the first age pot the withdrawn reaction materials were agitated and maintained at a temperature of about 44° C. for about 15 minutes. In this first age pot continued reactions and/or further reactions took place to essentially complete the formation of intermediate products thereby improving the overall yield of HMX from the process.

From the first age pot the reaction products were then withdrawn to the second nitrator. In the second nitrator further ingredients were introduced as follows: ammonium nitrate dissolved in nitric acid (56.4% nitric acid) at the rate of 33.1 grams per minute; acetic anhydride (97.9% anhydride) at the rate of 76.8 grams per minute. These incoming ingredients were passed through a constant temperature bath in order that the temperature was raised and held at about 40° C. The reaction mixture in the second nitrator was agitated vigorously and maintained at a temperature of about 44° C. The addition of these further ingredients in the second nitrator effected the second stage of nitration which is essential to the formation of HMX. Further nitration to HMX of intermediates formed in the first nitration stage occurs in the second nitrator. After about 4 minutes reaction time in the second reactor, products containing HMX were withdrawn from the reactor to a surge tank. The products are agitated and maintained at 44° C. in the surge tank. At 30-minute intervals, the contents of the surge tank were pumped to one of the final age pots. In these age pots the final reaction mixture is aged for 60 minutes with vigorous agitation while the temperature is controlled at 44° C., thereby permitting the formation of HMX to approach completion.

The hydrolysis of the excess acetic anhydride and the unstable reaction by-products is effected by the addition of 1500 ml. of water to the final age pot and by heating the aqueous mixture to 98–102° C. in which range the temperature is maintained for 30 minutes.

The product slurry is cooled to 30° C. and filtered with large Büchner funnels being used to recover the crystalline product which was washed with water until free of acid. The cake was then dried by heating in a steam oven.

In operation in accordance with this Example I for two hours and ten minutes, the effluent from the second nitrator was collected for one hour and thirty minutes from which 991.6 grams of crude HMX were obtained. The average purity of this HMX was 73%, the remainder being RDX. The yield was 0.84 gram of pure HMX produced per gram of hexamine consumed. All HMX crystals were beta-HMX.

EXAMPLE II

In accordance with this example and in order to start up the process, the first nitrator was charged with a starting heel of 300 ml. of glacial acetic acid, 25 ml. acetic anhydride and 8 g. of paraformaldehyde. These charged materials in the first nitrator were brought up to a temperature of about 44° C. There was then continuously fed into the first nitrator hexamine dissolved in acetic acid (90.4% acetic acid) at the rate of about 101 grams per minute. Ammonium nitrate is dissolved in nitric acid, which may be approximately 50 degrees Baumé, to form a solution containing 56.4% nitric acid. This solution was fed into the first reactor through a separate conduit at the rate of 22.0 grams per minute. Acetic anhydride (97.5% minimum purity) was fed into the nitrator through another conduit at the rate of 53.3 grams per minute. Paraformaldehyde was fed incrementally by charging into the nitrator 4 grams each 15 minutes. While maintaining reaction at approximately the aforementioned temperature of 44° C., the ingredients were subjected to vigorous agitation. As earlier mentioned, the incoming feed materials are preferably passed through a constant temperature bath to preheat them and maintain them at a uniform temperature of 40° C. as they are being fed into the first nitrator as this permits more accurate feed control. After about 15 minutes reaction time at the temperature of about 44° C. in the first nitrator, a certain portion of the ingredients had reacted. Therefore, reaction product was then continuously withdrawn from the first nitrator to the first age pot.

In the first age pot the withdrawn reaction materials were agitated and maintained at a temperature of about 44° C. for about 15 minutes. In this first age pot continued reactions and/or further reactions took place to essentially complete the formation of intermediate products thereby improving the overall yield of HMX from the process.

From the first age pot the reaction products were then withdrawn to the second nitrator. In the second nitrator further ingredients were introduced as follows: ammonium nitrate dissolved in nitric acid (56.4% nitric acid) at the rate of 33.1 grams per minute; acetic anhydride (97.9% anhydride) at the rate of 76.8 grams per minute. These incoming ingredients were passed through a constant temperature bath in order that the temperature was raised and held at about 40° C. The reaction mixture in the second nitrator was agitated vigorously and maintained at a temperature of about 44° C. The addition of these further ingredients in the second nitrator effected the second stage of nitration which is essential to the formation of HMX. Further nitration to HMX of intermediates formed in the first nitration stage ocurs in the second nitrator.

After about 4 minutes reaction time in the second nitrator, products containing HMX were withdrawn from the reactor to a surge tank. The products are agitated and maintained at 44° C. in the surge tank. At 30-minute intervals, the contents of the surge tank were pumped to one of the final age pots. In these age pots the final reaction mixture is aged for 60 minutes with vigorous agitation while the temperature is controlled at 44° C., thereby permitting the formation of HMX to approach completion.

The hydrolysis of the excess acetic anhydride and the unstable reaction by-products is effected by the addition of 1500 ml. of water or dilute acetic acid to the final age pot and by heating the aqueous mixture to 98–102° C. in which range the temperature is maintained for 30 minutes. The product slurry is cooled to 30° C., and the crystalline product recovered by filtering the HMX slurry with large Büchner funnels. The filter cake was washed with water until free of acid, and the cake was then dried by heating in a steam oven.

In operation in accordance with this Example II for two hours and ten minutes, the effluent from the second nitrator was collected for one hour and thirty minutes from which a total of 986 grams of crude HMX was obtained. The average purity of this HMX was 77.5%. The yield was 0.875 gram of pure HMX produced per gram of hexamine consumed. All HMX crystals were beta-HMX.

EXAMPLE III

In this example and in order to start up the process, the first nitrator was charged with a starting heel of 300 ml. of glacial acetic acid and 25 ml. of acetic anhydride. These charged materials in the first nitrator were brought up to a temperature of 44° C. and the process operation was conducted in a manner similar to that of Example I, the hexamine being nitrated in two stages with aging of the intermediate products after first stage of nitration, and with aging of the reaction product from the second nitrator. The aged reaction product in the final age pot is hydrolyzed and cooled. The crystalline product was recovered by filtration, washing and drying.

The unit was operated for two hours and ten minutes during which time the effluent from the second nitrator was collected for one hour and thirty minutes. A total of 971 grams of crude HMX was obtained which contained 71% pure HMX. The yield was 0.80 gram of pure HMX per gram of hexamine consumed. All HMX crystals were beta-HMX.

EXAMPLE IV

In accordance with this example and in order to start up the process, a starting heel of 300 ml. of glacial acetic acid and 25 ml. of acetic anhydride was charged to the first nitrator. These charged materials in the first nitrator were brought up to a temperature of about 44° C. There was then continuously fed to the first nitrator hexamine dissolved in acetic acid at the rate of about 101 grams per minute. Ammonium nitrate dissolved in nitric acid (56.4% nitric acid) was fed into the first nitrator through a separate conduit at the rate of about 22.0 grams per minute. Acetic anhydride (97.9% anhydride) was fed into the nitrator through another conduit at the rate of 57.9 grams per minute. The reaction temperature was maintained at about 44° C., and the reactants were subjected to vigorous agitation. After about 15 minutes reaction time, the reaction products were continuously withdrawn to the first age pot.

In the first age pot, the withdrawn reaction materials were agitated and the temperature was maintained at about 44° C. After a retention time of about 15 minutes, the reaction products were withdrawn continuously to the second nitrator.

In the second nitrator further ingredients were introduced as follows: ammonium nitrate dissolved in nitric acid (56.4% nitric acid) at the rate of 33.1 grams per minute and acetic anhydride (97.9% anhydride) at the rate of 72.3 grams per minute. The reaction mixture in the second nitrator was subjected to vigorous agitation and the reaction temperature maintained at about 44° C.

After about 4 minutes retention time the reaction materials were continuously withdrawn to the surge tank and treated in a manner similar to that of Example I, which treatment consisted of final aging, filtration, washing, and drying.

In accordance with the above procedure the unit was operated for two hours and ten minutes. The effluent from the second nitrator was collected for one hour and thirty minutes from which a total of 854 grams of crude HMX was produced. The average purity of the HMX was 73%. The yield was 0.72 gram pure HMX produced per gram of hexamine consumed. All of the HMX crystals were beta-HMX.

EXAMPLE V

In accordance with this example beta-HMX was produced directly by continuously nitrating hexamine in two stages and by aging the final reaction mixture from the second nitrator. The process is similar to that of Example II with the exception that a first age pot was not used; therefore, the reaction mixture from the first nitrator was continuously withdrawn into the second nitrator.

The average purity of the HMX produced was 77%. The yield was 0.86 gram of pure HMX per gram of hexamine consumed. All HMX crystals were in the form of the beta polymorph.

For best results it is preferred to maintain the temperature at about 44° C. plus or minus 1°. However, some latitude in temperature, as for example operating generally within the range of 40–50° C. is satisfactory. The use of acetic acid and acetic anhydride, since they are the lower anhydrides and relatively readily available commercial chemicals, are preferred. However, other acids and anhydrides may be substituted in part or completely, such as propionic acids and anhydrides, and butyric acids and anhydrides.

Other changes which may be made in our process are as follows: (1) the nitrators and/or age pots may be replaced with other equipment which provides for agitation of the reaction mixture, control of the reaction temperature, and prevention of the reaction products from depositing on the heat transfer surfaces. The agitator and doctor blade of a vessel may be concentrically mounted. Agitation of the reactants can also be effected by means of a pump which circulates a portion of reaction product and the incoming reactants through a heat exchanger. (2) The first age pot can be eliminated by withdrawing the reaction product from the first nitrator into the second nitrator. (3) Final aging of the reaction product from the second nitrator can be accomplished by means of a continuous aging process in which the reaction product flows successively through one or more vessels which provide agitation and means for temperature control. Similarly, the material from the final aging step of the process may be hydrolyzed in continuous rather than batchwise fashion. (4) The rotameters used for controlling the rate of addition of the reactants could be replaced with other equipment which would provide for accurate measurement and control of the reactant rates.

The HMX produced by this process is a powerful explosive. It may be incorporated with TNT to provide a composition which is readily castable. The HMX produced by the present invention may be coated with various plastics, such as polystyrene, cellulose acetate, and cellulose acetate-butyrate to make an explosive molding powder. The HMX may be coated with wax such as paraffin wax, bees wax, carnuba was, to make a composition that may be readily pressed. Other variations in the employment of the HMX of the present invention will be apparent to those skilled in the art.

We claim:

1. The process for the direct production of beta-HMX which comprises substantially continuously feeding into a precharged nitrator zone raw materials comprising hexamine, nitric acid, ammonium nitrate and acetic anhydride, the hexamine being dissolved in acetic acid and the rate of feed of said hexamineacetic acid solution being substantially greater than the rate of feed of the acetic anhydride in said nitrator zone, vigorously agitating together the aforementioned materials and maintaining them under a temperature between 40–50° C. for at least 15 minutes until at least some nitration has occurred, withdrawing reaction product from the nitrator zone to a further zone wherein the withdrawn reaction products are further agitated and permitted to age at a temperature between 40–50° C., withdrawing at least a portion of these aged materials to a second nitrator zone wherein further quantities of nitric acid, acetic anhydride and ammonium nitrate are incorporated into the reaction, subjecting the materials in this second nitrator zone to vigorous agitation and maintaining the temperature between 40–50° C., withdrawing such reaction mixture from the second nitrator zone to a further zone wherein the withdrawn reaction products are further agitated and permitted to age at a temperature between 40–50° C. whereby a reaction mixture containing a substantial portion of beta-HMX is produced, withdrawing such reaction mixture to further treatment which includes hydrolysis, filtering, washing and drying for obtaining a crystalline beta-HMX product.

2. The process for the direct production of beta-HMX which comprises reacting together in a first nitrator zone raw materials comprising hexamine, nitric acid, ammonium nitrate and acetic anhydride, the rate of feed of the raw materials being carefully controlled, the reaction being conducted by vigorously agitating together the aforementioned raw materials and maintaining them under a temperature between 40–50° C. in said first nitrator zone, withdrawing reaction product from the first nitrator zone to a further zone wherein the withdrawn materials are further agitated and permitted to age at a temperature of 40–50° C., withdrawing the aged materials to a second nitrator zone wherein controlled quantities of nitric acid, acetic anhydride and ammonium nitrate are incorporated into the reaction, subjecting the materials in this second nitrator zone to agitation and a temperature between 40–50° C., withdrawing reaction product from the second nitrator zone to a further zone wherein the withdrawn materials are further agitated and permitted to age at a temperature between 40–50° C. whereby a reaction mixture containing a substantial portion of beta-HMX is produced, withdrawing such reaction mixture to further treatment for isolating a crystalline beta-HMX product.

3. The process for the direct production of beta-HMX which comprises reacting together in a first nitrator zone raw materials comprising hexamine, nitric acid, ammonium nitrate and acetic anhydride, withdrawing reaction product from the first nitrator zone to a further vessel wherein the withdrawn materials are agitated and permitted to age, withdrawing the aged materials to a second nitrator zone wherein further quantities of nitric acid, acetic anhydride and ammonium nitrate are incorporated into the reaction, withdrawing reaction product from the second nitrator zone to a further zone wherein the withdrawn materials are agitated and permitted to age to produce a reaction mixture containing HMX, and withdrawing such reaction mixture to further treatment which includes hydrolysis, filtering, washing, and drying for obtaining a crystalline beta-HMX product.

4. The continuous process for the direct production of beta-HMX which includes the steps of reacting together in a first nitrator zone reaction material comprising hexamine, nitric acid, ammonium nitrate and acetic anhydride, continuously withdrawing reaction product from the first nitrator zone to aging, withdrawing aged materials to a second nitrator zone wherein the materials are reacted with further nitric acid, acetic anhydride and ammonium nitrate, withdrawing reaction product to further treatment which includes isolation of the HMX product, the improvement step which comprises carrying out the aforesaid reaction steps under a controlled temperature of about 44° C.

5. A process for the direct production of beta-HMX which comprises supplying raw materials comprising hexamine, nitric acid, ammonium nitrate and acetic anhydride through a constant temperature bath to a first nitrator zone, causing at least a portion of the supply of materials to react in the first nitrator zone, withdrawing reaction product from the first nitrator zone through an aging zone to a second nitrator zone, supplying further nitric acid, acetic anhydride and ammonium nitrate through a constant temperature bath to said second nitrator zone, causing at least a portion of the materials to react in the second nitrator zone, withdrawing reaction product through an aging zone to produce a reaction product containing HMX and withdrawing at least a portion of such reaction product to further treatment for isolating crystalline beta-HMX product.

6. In a process for the manufacture of beta-HMX by reacting together hexamine, nitric acid, ammonium nitrate and a lower aliphatic acid anhydride, the improvement which comprises carrying out a portion of said reaction in a first nitrator zone, and carrying out further reaction on the product from said first nitrator in a second nitrator zone.

7. In a process for the manufacture of beta-HMX by reacting the reaction materials hexamine, nitric acid, ammonium nitrate and a lower aliphatic acid anhydride, the improvement which comprises bringing at least a substantial portion of the aforementioned reaction materials to a substantially constant temperature and then mixing the constant temperature materials with vigorous agitation in a zone maintained under a controlled predetermined temperature within the range of 40–50° C.

References Cited

UNITED STATES PATENTS

| | | | |
|---|---|---|---|
| 1,945,229 | 1/1934 | Pagon | 23—290 |
| 2,647,897 | 8/1953 | Weidner | 260—248.5 |
| 2,755,853 | 7/1956 | Edgelt et al. | 23—290 |
| 2,764,581 | 9/1956 | Scholz et al. | 260—248.5 |
| 2,798,870 | 7/1957 | Bachman | 260—248 |

OTHER REFERENCES

Bachman et al.: J.A.C.S., 71, 1842–5 (1949).
Helmuth: Chem. Ber., 82, 192–3 (1949).
Epstein et al.: Can. J. Chem., 30, 734–742 (1952).

LELAND A. SEBASTIAN, Primary Examiner

U.S. Cl. X.R.

23—260, 266; 149—11, 92